United States Patent [19]

Sone et al.

[11] Patent Number: 5,306,769
[45] Date of Patent: Apr. 26, 1994

[54] ACETAL COPOLYMER AND PROCESS FOR PRODUCING SAME

[75] Inventors: Tatsuo Sone; Tadashige Hata; Kazuhiko Matsuzaki, all of Kurashiki

[73] Assignee: Asahi Kasei Kogyo Kabushiki Kaisha, Osaka, Japan

[21] Appl. No.: 656,062

[22] PCT Filed: Jun. 18, 1990

[86] PCT No.: PCT/JP90/00792
§ 371 Date: Feb. 13, 1991
§ 102(e) Date: Feb. 13, 1991

[87] PCT Pub. No.: WO90/15842
PCT Pub. Date: Dec. 27, 1990

[30] Foreign Application Priority Data

Jun. 19, 1989 [JP] Japan .................. 1-154647
Aug. 11, 1989 [JP] Japan .................. 1-206619
Dec. 29, 1989 [JP] Japan .................. 1-342941
Mar. 15, 1990 [JP] Japan .................. 2-062514
Mar. 15, 1990 [JP] Japan .................. 2-062515

[51] Int. Cl.⁵ .................................. C08G 63/91
[52] U.S. Cl. ........................ 525/64; 525/63; 525/55; 525/154
[58] Field of Search .......... 525/64, 63, 55, 154

[56] References Cited

U.S. PATENT DOCUMENTS

4,535,127 8/1985 Matsuzaki et al. ............. 525/399

FOREIGN PATENT DOCUMENTS

0115373B1 8/1984 European Pat. Off. .
50-119055 9/1975 Japan .
60-18511 1/1985 Japan .
60-40111 3/1985 Japan .

OTHER PUBLICATIONS

Derwent Abstract, No. 76:06478X [04], of JP-B-50 039709, Dec. 18, 1975 (Daicel K. K.).
Derwent Abstract, No. 73:47693U [34], of JP-A-48 001095, JP-B-52 049035, Dec. 14, 1977 (Daicel Co. et al.).

Primary Examiner—John Kight, III
Assistant Examiner—Richard Jones
Attorney, Agent, or Firm—Armstrong, Westerman, Hattori, McLeland & Naughton

[57] ABSTRACT

Disclosed are an acetal copolymer composed of polyacetal units and particulate crosslinked polymer units which has a viscosity of 0.1-10 dl/g and comprises a polyacetal and a particulate crosslinked polymer other than a polyacetal which has a functional group selected from the group consisting of a hydroxyl group, a carboxyl group, an amino group, an amide group, an alkoxy group, an acid anhydride group, and an epoxy group and has an average particle size of 0.01-10 μm, said polyacetal and particulate crosslinked polymer being reaction bonded to each other through the functional group and a process for producing an acetal copolymer composed of polyacetal units and polymer units other than polyacetals which comprises a polyacetal and a polymer other than a polyacetal which are reaction bonded to each other through a functional group mentioned below and which has a viscosity of 0.1-10 dl/g, said process comprising homopolymerizing formaldehyde or trioxane or copolymerizing formaldehyde or trioxane with a cyclic ether in the presence of a polymer other than a polyacetal which has a functional group selected from the group consisting of a hydroxyl group, a carboxyl group, an amino group, an amide group, an alkoxy group, an acid anhydride group, and an epoxy group and which has an average dispersion particle size of 0.01-2000 μm.

25 Claims, No Drawings

ACETAL COPOLYMER AND PROCESS FOR PRODUCING SAME

TECHNICAL FIELD

The present invention relates to a novel acetal copolymer and a process for producing it. More particularly, the present invention relates to an acetal copolymer which comprises a polyacetal and a particulate crosslinked polymer other than a polyacetal which has a functional group and has an average particle size of 0.01–10 μm, said polyacetal and particulate crosslinked polymer being reaction bonded through said functional group, and a process for producing an acetal copolymer which comprises homopolymerizing formaldehyde or trioxane or copolymerizing formaldehyde or trioxane with a cyclic ether in the presence of a polymer other than a polyacetal which has a functional group and has an average dispersion particle size of 0.01–2,000 μm.

BACKGROUND TECHNIQUE

Recently, there has been a great demand for polyacetals as engineering plastics because of their superior mechanical characteristics, fatigue characteristics and frictional wear characteristics. However, with diversification of uses and demand for enhancement of functions of polyacetals, properties possessed by polyacetals cannot satisfy all of the requirements.

In order to improve this point, extensive research has been conducted on modification of polyacetals, for example, a polymer alloying technique where a polyacetal and a resin other than a polyacetal are blended or a technique to modify the skeleton by introducing a component other than a polyacetal into the main chain of a polyacetal.

For example, as an example of the polymer alloying technique, EP-A-115373 discloses that a composition obtained by adding to a polyacetal an acrylic multiphase interpolymer having a two-phase structure and having a particle size of 10–100 μm is excellent in impact resistance.

However, the acrylic multi-phase interpolymer disclosed in the above patent publication has a rigid thermoplastic phase as the outermost phase and since affinity of this outermost phase to a polyacetal is insufficient, the composition cannot be said to be sufficient in high impact resistance required for engineering plastics. Further, the composition has the defect that impact resistance in a specific direction decreases significantly depending on processing conditions.

Specifically, impact resistance in a specific direction decreases when processing is conducted under conditions which apply orientation to the multi-phase interpolymer dispersed in the polyacetal in processing such as injection molding, extrusion molding, and blow molding. For example, in a weld portion which is formed by joining molten resins to each other in a mold for injection molded products, impact resistance in a specific direction of the molded product, namely, weld strength greatly decreases. This phenomenon occurs due to the fact that the multi-phase interpolymer dispersed in the polyacetal is not uniformly dispersed in all portions of the molded product, but non-uniform ununiform dispersion such as agglomeration or orientation occurs in the molded product.

Therefore, impact resistance of the composition disclosed in the above patent publication is non-uniform and compositions having mechanical properties excellent in isotropy cannot be obtained.

The mechanical properties excellent in isotropy in the present invention mean mechanical properties which show no reduction in tensile characteristics and impact resistance in a specific direction in any portion, especially a weld portion, of molded products and having uniformity.

Examples of the technique to modify the skeleton for solving the above problems are as shown below.

For example, U.S. Pat. No. 4,535,127 discloses that graft copolymers having a structure where a polyacetal is grafted on elastomers such as modified ethylene-propylene copolymer and modified styrene-butadiene copolymer have high impact resistance.

Moreover, U.S. Pat. No. 4,535,127 discloses that A-B-A triblock copolymers comprising polyacetal units (A) and elastomer units (B) have excellent impact resistance.

However, in these processes, normally, copolymerization is carried out in a system where the elastomer is completely dissolved in polymerization solvents or the like. Therefore, the resulting acetal copolymer just after being copolymerized is in a viscous slurry state and there is the problem that filtration and drying of the acetal copolymer are difficult and when the processes are industrially carried out, it is very difficult in the manufacturing technique to stably mass-produce acetal copolymers. Besides, since this problem becomes conspicuous with an increase in the amount of elastomer introduced into the acetal copolymer, acetal copolymers having a large introduction amount of elastomer cannot be produced and this is a serious obstacle in improving the impact resistance of acetal copolymers.

Furthermore, according to the processes of the above patent, acetal copolymers just after copolymerization are a viscous slurry state and hence, in a short time, the polymers stick to the wall of the polymerization tank and smooth operation cannot be conducted. This is a serious disadvantage.

DISCLOSURE OF THE INVENTION

An object of the present invention is to solve the problems in the conventional techniques and to provide acetal copolymers having mechanical properties excellent in isotropy while maintaining the excellent mechanical characteristics, fatigue characteristics and frictional wear characteristics possessed by polyacetals and a process for producing acetal copolymers excellent in production technique.

That is, as a result of intensive research conducted by the inventors, it has been found that a specific particulate crosslinked polymer functions as a good molecular weight modifier and the resulting acetal copolymers have mechanical properties excellent in isotropy. It has further been found that the acetal copolymers of the present invention can be produced easily by using a specific particulate polymer as a molecular weight modifier.

That is, the present invention relates to a copolymer composed of polyacetal units and particulate crosslinked polymer units which comprises a polyacetal and a particulate crosslinked polymer other than a polyacetal which has a functional group selected from the group consisting of a hydroxyl group, a carboxyl group, an amino group, an amide group, an alkoxy group, an acid anhydride group and an epoxy group and has an average particle size of 0.01–10 μm, said polyacetal and particulate crosslinked polymer being reaction bonded through said functional group, and which has a viscosity of 0.1-10 (dl/g), and a process for producing an acetal copolymer composed of polyacetal units and polymer units other than polyacetals and having a viscosity of 0.1-10 (dl/g) which comprises homopolymerizing formaldehyde or trioxane or copolymerizing formaldehyde or trioxane with a cyclic ether in the presence of a polymer other than a polyacetal which has a functional group selected from the group consisting of a hydroxyl group, a carboxyl group, an amino group, an amide group, an alkoxy group, an acid anhydride group, and an epoxy group and has an average dispersion particle size of 0.01-2000 μm, to thereby allow the polyacetal and the polymer other than a polyacetal to reaction bond to each other through the above functional group.

BEST MODE FOR CARRYING OUT THE INVENTION

The acetal copolymers of the present invention will be specifically explained.

The acetal copolymers of the present invention are those which comprise polyacetal units and particulate crosslinked polymer units wherein a polyacetal and a particulate crosslinked polymer having a functional group selected from the group consisting of a hydroxyl group, a carboxyl group, an amino group, an amide group, an alkoxy group, an acid anhydride group, and an epoxy group are reaction bonded through the functional group and the copolymer has a structure of particulate crosslinked polymer units being grafted on polyacetal units.

The polyacetal units in the present invention include polyacetal homopolymer and polyacetal copolymer. The polyacetal homopolymer is a polymer comprising repeating oxymethylene units $+CH_2O+$.

The polyacetal copolymer is a polymer having a structure where oxyalkylene units:

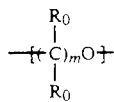

$$+(\underset{R_0}{\overset{R_0}{C}})_mO+$$

(wherein $R_0$ is selected from hydrogen, an alkyl group and an aryl group and a plurality of $R_0$ may be identical or different and m is 2-6) are randomly inserted in a chain comprising oxymethylene units.

The proportion of oxyalkylene units inserted in the polyoxymethylene copolymer is 0.05-50 mols, and more preferably 0.1-20 mols, per 100 mols of oxymethylene units.

The oxyalkylene units include, for example, oxyethylene units, oxypropylene units, oxytrimethylene units, oxytetramethylene units, oxybutylene units, and oxyphenylethylene units.

Of these oxyalkylene units, oxyethylene units $+(CH_2)_2O+$ and oxytetraethylene units $+(CH_2)_4O+$ are especially preferred for improving the properties of the acetal copolymer.

The particulate crosslinked polymer unit which is another component of the acetal copolymer of the present invention is a particulate crosslinked polymer composed mainly of a copolymer of one or two or more vinyl monomers and a polyfunctional crosslinking agent and is derived from a particulate crosslinked polymer having a functional group selected from the group consisting of a hydroxyl group, a carboxyl group, an amino group, an amide group, an alkoxy group, an acid anhydride group, and an epoxy group.

As the vinyl monomers, mention can be made of, for example, aromatic compounds such as styrene, p-methylstyrene, and α-methylstyrene; halogen compounds such as vinyl chloride and vinylidene chloride; nitrile compounds such as acrylonitrile and methacrylonitrile; methacrylate esters such as methyl methacrylate, ethyl methacrylate, propyl methacrylate, butyl methacrylate, isobutyl methacrylate, and n-stearyl methacrylate; acrylate esters such as methyl acrylate, ethyl acrylate, n-butyl acrylate, and 2-ethylhexyl acrylate; vinyl esters such as vinyl acetate and vinyl propionate, and conjugated diene compounds such as butadiene and isoprene.

These vinyl monomers can also be used in combination of two or more.

These vinyl monomers are preferably acrylate esters, methacrylate esters, conjugated diene compounds, aromatic compounds and nitrile compounds.

More preferred are n-butyl acrylate, 2-ethylhexyl acrylate, ethyl acrylate, isopropyl acrylate, methyl methacrylate, ethyl methacrylate, propyl methacrylate, isobutyl methacrylate, butadiene, styrene, and acrylonitrile.

As the polyfunctional crosslinking agent, there may be used crosslinking agents which are generally used, such as divinyl compounds, diallyl compounds, and dimethacryl compounds and preferred are ethyl diacrylate, n-butyl diacrylate, and diethylene glycol diacrylate. The proportion of the polyfunctional crosslinking agent is preferably 0.1-20% by weight, and more preferably, 0.1-5.0% by weight based on total weight of the particulate crosslinked polymer.

The particulate crosslinked polymer having a functional group is a particulate polymer having an average particle size of 0.01-10 μm which is obtained by copolymerizing one or more vinyl monomers constituting the particulate crosslinked polymer unit, a polyfunctional crosslinking agent, and one or more graft-copolymerizable vinyl monomers having a functional group selected from the group consisting of a hydroxyl group, a carboxyl group, an amino group, an amide group, an alkoxy group, an acid anhydride group, and an epoxy group.

The functional group of the particulate crosslinked polymer is derived from the functional group of the above graft-copolymerizable vinyl monomer and the acetal copolymer of the present invention comprising the polyacetal and the particulate crosslinked polymer are reaction bonded through the functional group of the graft-copolymerizable vinyl monomer.

The graft-copolymerizable monomers having a functional group can be classified into the following seven groups.

The first group includes graft-copolymerizable vinyl monomers having a hydroxyl group such as, for example, 2-hydroxyethyl methacrylate, 2-hydroxyethyl acrylate, p-hydroxystyrene, allyl alcohol, and vinyl alcohol.

The second group includes graft-copolymerizable vinyl monomers having a carboxyl group such as, for example, acrylic acid, methacrylic acid, maleic acid, fumaric acid, itaconic acid, citraconic acid, and tetrahydrophthalic acid.

The third group includes graft-copolymerizable vinyl monomers having an amino group such as, for example, m-aminostyrene and p-dimethylaminostyrene.

The fourth group includes graft-copolymerizable vinyl monomers having an amide group such as, for example, acrylamide and methacrylamide.

The fifth group includes graft-copolymerizable monomers having an alkoxy group such as, for example, methoxyvinyl, butoxyvinyl, p-methoxystyrene, and 2-methoxyethyl methacrylate.

The sixth group includes graft-copolymerizable vinyl monomers having an acid anhydride group such as, for example, maleic anhydride, citraconic anhydride, itaconic anhydride and tetrahydrophthalic anhydride.

The seventh group includes graft-copolymerizable vinyl monomers having an epoxy group such as, for example, p-glycidyl α-methylstyrene, glycidyl methacrylate, glycidylethyl acrylate, glycidylethyl methacrylate, and glycidylvinyl.

These graft-copolymerizable vinyl monomers can also be used simultaneously in a combination of two or more.

Furthermore, introduction of a functional group into the particulate crosslinked polymer can also be carried out by reacting a reactive group contained in the particulate crosslinked polymer with a reactive group of a compound having a functional group and a reactive group in combination. Alternatively, the particulate crosslinked polymer can also be synthesized by modifying a functional group introduced into a particulate crosslinked polymer by means of hydrolysis or the like.

Graft-copolymerizable vinyl monomers are preferably graft-copolymerizable vinyl monomers having a hydroxyl group from the point of stability of reaction bonding between the polyacetal and the particulate crosslinked polymer.

The proportion of the graft-copolymerizable vinyl monomer is preferably 0.05-30% by weight based on the total weight of the particulate crosslinked polymer. If it is less than 0.05% by weight, reaction bonding between the polyacetal and the particulate crosslinked polymer is difficult and, if it is more than 30% by weight, mechanical properties of the resulting acetal copolymer greatly deteriorate. A more preferred range is 0.1-20% by weight.

The particulate crosslinked polymer is a polymer which is particulate in its primary form and has an average particle size of 0.01-10 μm. The primary form is a form which constitutes a minimum unit of particulate crosslinked polymer and is normally handled as an agglomerate of particles in this primary form.

If the average particle size of the particulate crosslinked polymer is less than 0.01 μm, excellent properties such as impact resistance and weathering resistance possessed by the particulate crosslinked polymer cannot be imparted to acetal copolymer and if it is more than 10 μm, mechanical properties excellent in isotropy referred to in the present invention cannot be imparted to the acetal copolymer.

The average particle size of the particulate crosslinked polymer is more preferably within the range of 0.1-1 μm.

The particulate crosslinked polymer preferably has a narrow breadth of particle size distribution. When particle size distribution is wide, the mechanical properties excellent in isotropy referred to in the present invention cannot be imparted to the resulting acetal copolymer.

The particle size distribution of the particulate crosslinked polymer is more preferably within the range of 0.01-20 μm.

The viscosity of the acetal copolymer of the present invention must be within the range of 0.1-10 (dl/g).

The viscosity used herein is one measured in a mixed solvent of 50% by weight of p-chlorophenol and 50% by weight of tetrachloroethane at 60° C. by a usual Ostwald viscometer. Specifically, 25 mg of a sample (polymer) to be measured is dissolved in 5 ml of the above mixed solvent and the time ($T_1$) required for the solution to pass between marked lines of the viscosity tube is measured at 60° C. Similarly, measurement is conducted with only the mixed solvent and the time required is referred to as $T_2$. The viscosity in the present invention is obtained by the following calculation formula.

$$\text{Viscosity} = \frac{T_1 - T_2}{T_2} \times 2 \text{ (dl/g)}$$

If the viscosity of the acetal copolymer is less than 0.1 (dl/g), mechanical properties of the acetal copolymer deteriorate to lose practicality. If the viscosity is more than 10 (dl/g), processability of the acetal copolymer deteriorates considerably and in this case, too, the acetal copolymer lacks practicality.

The viscosity of the acetal copolymer is more preferably 0.5-5 (dl/g).

The particulate crosslinked polymer units of the present invention may have a multi-phase structure of two or more phases comprising repeating soft and hard phases. The "soft phase" herein means a phase comprising a polymer softer than the polymer constituting the hard phase and the "hard phase" here means a phase comprising a polymer harder than the polymer constituting the soft phase.

The glass transition temperature (hereinafter referred to as "Tg") of the polymer constituting the soft phase is preferably lower than 25° C. and more preferably lower than 0° C. The Tg of the polymer constituting the hard phase is preferably 25° C. or higher, more preferably 50° C. or higher.

Preferably, the polymer has a soft phase comprising an acrylate ester or a conjugated diene compound and a hard phase comprising a methacrylate ester, an aromatic compound or a nitrite compound. More preferably, the soft phase comprises n-butyl acrylate, 2-ethylhexyl acrylate, ethyl acrylate, isopropyl acrylate, butadiene, or styrene-butadiene and the hard phase comprises methyl methacrylate, ethyl methacrylate, propyl methacrylate, isobutyl methacrylate, styrene, or acrylonitrile.

When the particulate crosslinked polymer unit has a multi-phase structure, the particulate crosslinked polymer unit preferably has a two-phase structure.

When the particulate crosslinked polymer has a multi-phase structure, the boundary between respective phases may be an unclear and vague boundary. For example, in the case of a particulate crosslinked polymer of a two-phase structure which has a hard phase outside a soft phase, the boundary between the soft and hard phases may be a vague boundary which has a gradual variation in composition from the composition of the polymer constituting the soft phase to the composition of the polymer constituting the hard phase. In this case, when a part of the polymer constituting the hard phase enters into the soft phase and forms fine and many domains, the particulate crosslinked polymer unit can also be said to have the multi-phase structure of the present invention.

When the particulate crosslinked polymer unit has a multi-phase structure, it is preferred to use the above-mentioned polyfunctional crosslinking agent and the following polyfunctional grafting agent in combination.

The polyfunctional grafting agent includes polyfunctional monomers having functional groups different in reaction rate such as, for example, allyl esters of acrylic acid, methacrylic acid, maleic acid and fumaric acid. Allyl acrylate and allyl methacrylate are preferred. The proportion of the polyfunctional grafting agent is preferably 0.1-5.0% by weight, and more preferably 0.1-2.5% by weight, based on the total weight of the polymer constituting the phase which is the base for grafting.

The proportion of the particulate crosslinked polymer contained in the acetal copolymer of the present invention is preferably 1.0-90% by weight based on the total weight of acetal copolymer. If the proportion of particulate crosslinked polymer is less than 1.0% by weight, the excellent characteristics such as impact resistance and weathering resistance possessed by the particulate crosslinked polymer cannot be imparted to the acetal copolymer and if it is more than 90% by weight, the excellent mechanical properties and frictional wear characteristics possessed by the polyacetal cannot be imparted to the acetal copolymer.

The proportion of the particulate crosslinked polymer is more preferably 5.0-70% by weight.

The proportion of the particulate crosslinked polymer in the acetal copolymer of the present invention or the structure of the acetal copolymer (presence or absence of reaction bonding between the polyacetal and the particulate crosslinked polymer) can be confirmed by the following method.

That is, when the acetal copolymer is hydrolyzed in an acidic aqueous solution, the portion comprising the repeating oxymethylene units is converted to formaldehyde and the portion of oxyalkylene unit inserted into the polyacetal copolymer is converted to an alkylene glycol of the following formula:

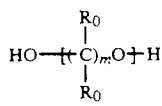

(wherein $R_0$ is selected from hydrogen, an alkyl group and aryl group and a plurality of $R_0$ may be identical or different and $m=2$-$6$).

The formaldehyde and alkylene glycol are analyzed and amounts thereof are determined by means such as gas chromatography and liquid chromatography.

The particulate crosslinked polymer units contained in the acetal copolymer become the particulate crosslinked polymer having the functional group mentioned above since the bond between the polyacetal units and particulate crosslinked polymer units is cut. This particulate crosslinked polymer is precipitated from aqueous solution. Analysis and determination of the amount of the precipitated particulate crosslinked polymer are conducted by a usual polymer analysis method.

It is preferred to use a suitable particulate crosslinked polymer depending on the required characteristics of the acetal copolymer of the present invention.

For example, when impact resistance is imparted to the acetal copolymer, the particulate crosslinked polymer units preferably comprise a polymer having a Tg of lower than 25° C., and preferably lower than 0° C. Alternatively, preferred are particulate crosslinked polymer units of two-phase structure having a hard phase outside a soft phase and having a higher proportion of the soft phase, the Tg of the polymer constituting the soft phase being preferably lower than 25° C., and more preferably lower than 0° C.

Furthermore, when weathering resistance is imparted to the acetal copolymer, it is preferred to use particulate crosslinked polymer units comprising an acrylate ester or methacrylate ester which is superior in weathering resistance.

Besides, when coating and printing characteristics are imparted to the acetal copolymer, it is preferred to use particulate crosslinked polymer unit comprising compounds low in solvent resistance and high in polarity such as aromatic compounds, nitrile compounds, methacrylate esters, and acrylate esters. More preferred is to use particulate crosslinked polymer units comprising styrene, acrylonitrile, methyl methacrylate, isobutyl methacrylate or methyl acrylate.

Next, the process for producing the acetal copolymer of the present invention will be explained.

The acetal copolymer of the present invention can be produced by homopolymerizing formaldehyde or trioxane or copolymerizing formaldehyde or trioxane with a cyclic ether in the presence of a particulate crosslinked polymer other than a polyacetal which has a functional group selected from the group consisting of a hydroxyl group, a carboxyl group, an amino group, an amide group, an alkoxy group, an acid anhydride group, and an epoxy group and has an average dispersion particle size of 0.01-2000 μm.

The particulate crosslinked polymer used in the present invention can be produced by the following process.

The particulate crosslinked polymer of the present invention is a polymer other than a polyacetal which has a functional group selected from the group consisting of a hydroxyl group, a carboxyl group, an amino group, an amide group, an alkoxy group, an acid anhydride group and an epoxy group and has an average particle size of 0.01-10 μm.

The particulate crosslinked polymer can be produced by a customary emulsion polymerization technique using a vinyl monomer mentioned below, a graft-copolymerizable vinyl monomer having a functional group selected from the group consisting of a hydroxyl group, a carboxyl group, an amino group, an amide group, an alkoxy group, an acid anhydride group and an epoxy group, and a polyfunctional crosslinking agent for giving a proper crosslinking degree. When the particulate crosslinked polymer should have a multi-phase structure, a polyfunctional grafting agent for chemical bonding of respective phases is used in addition to the above vinyl monomer, graft-copolymerizable vinyl monomer and polyfunctional crosslinking agent.

As usable vinyl monomers, mention can be made of, for example, aromatic compounds such as styrene, p-methylstyrene, and α-methylstyrene; halogen compounds such as vinyl chloride and vinylidene chloride; nitrile compounds such as acrylonitrile and methacrylonitrile; methacrylate esters such as methyl methacrylate, ethyl methacrylate, propyl methacrylate, butyl methacrylate, isobutyl methacrylate, and n-stearyl methacrylate; acrylate esters such as methyl acrylate, ethyl acrylate, n-butyl acrylate, and 2-ethylhexyl acrylate; vinyl esters such as vinyl acetate and vinyl propionate; and conjugated diene compounds such as butadiene and isoprene.

These vinyl monomers can also be used simultaneously in a combination of two or more.

These vinyl monomers are preferably acrylate esters, methacrylate esters, conjugated diene compounds, aromatic compounds and nitrile compounds.

More preferred are n-butyl acrylate, 2-ethylhexyl acrylate, ethyl acrylate, isopropyl acrylate, methyl methacrylate, ethyl methacrylate, propyl methacrylate, isobutyl methacrylate, butadiene, styrene, and acrylonitrile.

The graft-copolymerizable monomers having a functional group can be classified into the following seven groups.

The first group includes graft-copolymerizable vinyl monomers having a hydroxyl group such as, for example, 2-hydroxyethyl methacrylate. 2-hydroxyethyl acrylate, p-hydroxystyrene, allyl alcohol, and vinyl alcohol.

The second group includes graft-copolymerizable vinyl monomers having a carboxyl group such as, for example, acrylic acid, methacrylic acid, maleic acid, fumaric acid, itaconic acid, citraconic acid, and tetrahydrophthalic acid.

The third group includes graft-copolymerizable vinyl monomers having an amino group such as, for example, m-aminostyrene and p-dimethylaminostyrene.

The fourth group includes graft-copolymerizable vinyl monomers having an amide group such as, for example, acrylamide and methacrylamide.

The fifth group includes graft-copolymerizable monomers having an alkoxy group such as, for example, methoxyvinyl, butoxyvinyl, p-methoxystyrene, and 2-methoxyethyl methacrylate.

The sixth group includes graft-copolymerizable vinyl monomers having an acid anhydride group such as, for example, maleic anhydride, citraconic anhydride, itaconic anhydride and tetrahydrophthalic anhydride.

The seventh group includes graft-copolymerizable vinyl monomers having an epoxy group such as, for example, p-glycidyl α-methylstyrene, glycidyl methacrylate, glycidylethyl acrylate, glycidylethyl methacrylate, and glycidylvinyl.

These graft-copolymerizable vinyl monomers can also be used simultaneously in a combination of two or more.

Furthermore, introduction of a functional group into the particulate crosslinked polymer can also be carried out by reacting a reactive group contained in the particulate crosslinked polymer with a reactive group of a compound having a functional group and a reactive group in combination. Alternatively, the particulate crosslinked polymer having a functional group can also be synthesized by modifying a functional group introduced into a particulate crosslinked polymer by means of hydrolysis or the like.

When the polyacetal and the particulate crosslinked polymer are reaction bonded to each other, the reaction bonding is carried out through the graft-copolymerizable monomer.

The graft-copolymerizable monomer, namely, the functional group which the particulate crosslinked polymer has is preferably a graft-copolymerizable monomer having a hydroxyl group, considering the reaction rate for the functioning of the particulate crosslinked polymer as a molecular weight modifier during synthesis of the polyacetal.

The proportion of the graft-copolymerizable vinyl monomer is preferably 0.05-30% by weight based on the total weight of the particulate crosslinked polymer. If it is less than 0.05% by weight, reaction bonding between the polyacetal and the particulate crosslinked polymer is difficult and if it is more than 30% by weight, mechanical properties of the resulting acetal copolymer greatly deteriorate.

A more preferred range is 0.1-20% by weight.

Furthermore, the molecular weight of the polyacetal unit which constitutes the resulting acetal copolymer is determined depending on the proportion of graft-copolymerizable vinyl monomer, namely, proportion of functional groups possessed by the particulate crosslinked polymer. Therefore, it is preferred to determine the proportion of the graft-copolymerizable vinyl monomer depending on the molecular weight of the desired polyacetal unit.

As the polyfunctional crosslinking agent, there may be used crosslinking agents usually employed such as divinyl compounds, diallyl compounds, diacryl compounds, and dimethacryl compounds. Preferred are ethyl diacrylate, n-butyl diacrylate, and diethylene glycol diacrylate. The proportion of the polyfunctional crosslinking agent is preferably 0.1-20% by weight, and more preferably 0.1-5.0% by weight, based on the total weight of the particulate crosslinked polymer.

The polyfunctional grafting agent includes polyfunctional monomers having functional groups different in reaction rate, for example, allyl esters of acrylic acid, methacrylic acid, maleic acid, and fumaric acid and preferred are allyl acrylate and allyl methacrylate. The proportion of the polyfunctional grafting agent is preferably 0.1-5.0% by weight, and more preferably 0.1-2.5% by weight.

The particulate crosslinked polymer of the present invention can be produced, for example, by the following general emulsion polymerization method.

As an example, the production of a particulate crosslinked polymer having a two-phase structure having a hard phase outside a soft phase will be shown.

Vinyl monomer, polyfunctional crosslinking agent, polyfunctional grafting agent and polymerization initiator necessary for formation of the soft phase are added to water containing additives such as an emulsifier necessary for emulsion polymerization and polymerization is carried out with stirring.

As the emulsifier, there may be used alkylsulfosuccinate salts such as sodium dioctylsulfosuccinate, alkylaromatic sulfonate salts such as sodium dodecylbenzenesulfonate, and the like.

As the polymerization initiator, there may be used peroxides such as diisopropylbenzene hydroperoxide and benzoyl peroxide; azo compounds such as azobisisobutyronitrile; and the like.

When the polymerization reaction for forming the soft phase has been completed, then monomers for forming the hard phase are additionally added. In this case, if necessary, a polymerization initiator and emulsifier may be additionally added.

For producing a particulate crosslinked polymer having a large average particle size, it is preferred to repeat several times the procedure of removing unnecessary emulsifier, polymerization initiator, and unreacted monomers in the polymerization system and thereafter further adding proper amounts of monomers, emulsifier and polymerization initiator.

Emulsion polymerization is usually carried out at 50°–90° C.

The particulate crosslinked polymer obtained by the above emulsion polymerization can be separated with water while maintaining the shape of the particles by customary means such as salting-out, freeze-thawing and spray drying. The salting-out is carried out using a solution of electrolytes such as aluminum chloride and sodium chloride and the precipitate is filtered off. The precipitate is further subjected to washing and drying to obtain the particulate crosslinked polymer of the present invention.

For inhibiting a reduction in the heat stability of the resulting acetal copolymer, it is preferred to remove a catalyst such as peroxide used in the emulsion polymerization and impurities as much as possible from the particulate crosslinked polymer prior to producing the acetal copolymer of the present invention.

Next, the process for producing the acetal copolymer of the present invention using the thus obtained particulate crosslinked polymer will be shown.

For easy production of the acetal copolymer which is a feature of the present invention, it is necessary to allow the particulate crosslinked polymer to be present as fine particles of 0.01–2,000 μm in average dispersion particle size in the polymerization system.

The words "in the polymerization system" mean "in the polymerization system where formaldehyde or trioxane is homopolymerized or formaldehyde or trioxane is copolymerized with a cyclic ether".

The "average dispersion particle size" means "average diameter of individual particles or agglomerates of particulate crosslinked polymer present in the polymerization system". That is, the average dispersion particle size includes the diameters of agglomerates of a portion of particulate crosslinked polymer having an average particle size of 0.01–10 μm.

If the average dispersion particle size is less than 0.01 μm, the excellent properties such as impact resistance and weathering resistance possessed by the particulate crosslinked polymer cannot be imparted to the acetal copolymer. If it is more than 2,000 μm, the function of the particulate crosslinked polymer as a molecular weight modifier during synthesis of the acetal copolymer is lowered.

The average dispersion particle size of the particulate crosslinked polymer is more preferably 0.1–1,000 μm.

The particulate crosslinked polymer preferably has a narrow breadth of dispersion particle size. When the breadth of dispersion particle size is broad, an acetal copolymer having mechanical properties excellent in isotropy cannot be obtained.

The distribution of dispersion particle size of the particulate crosslinked polymer is more preferably 0.01–1,000 μm.

Desirably, the particulate crosslinked polymer is purified by washing, adsorption, drying and the like before polymerization. Furthermore, the particulate crosslinked polymer can also be supplied in an admixture of two or more for polymerization.

It is preferred that particles of the particulate crosslinked polymer are swollen to such extent that the shape of the particles is not greatly destroyed in the polymerization system. This is for enhancing the function of the particulate crosslinked polymer having a functional group as a molecular weight modifier. On the other hand, if particles of the particulate crosslinked polymer are swollen too much in the polymerization system and the shape of the particles is lost or the particles are in a completely dissolved state, the resulting acetal copolymer is in the form of a viscous slurry. In this case, filtration and drying of the acetal copolymer are difficult and the object of the present invention to produce an acetal copolymer easily with respect to the production technique cannot be attained.

Formaldehyde or trioxane is used in the homopolymerization in the present invention. Formaldehyde or trioxane and cyclic ethers are used in the copolymerization.

The cyclic ethers used in the copolymerization include, for example, ethylene oxide, propylene oxide, butylene oxide, epichlorohydrin, styrene oxide, oxetane, 3,3-bis(chloromethyl)oxetane, tetrahydrofuran, oxepan, ethylene glycol formal, propylene glycol formal, diethylene glycol formal, triethylene glycol formal, 1,4-butanediol formal, 1,5-pentanediol formal, and 1,6-hexanediol formal. Of these cyclic ethers, especially preferred are ethylene oxide, ethylene glycol formal, diethylene glycol formal and 1,4-butanediol formal.

The proportion of the cyclic ether is preferably 0.03–100 parts by weight, and more preferably 0.1–50 parts by weight, per 100 parts by weight of formaldehyde or trioxane.

Generally, cationic polymerization catalysts or anionic polymerization catalysts are used for the homopolymerization and copolymerization according to the present invention.

The cationic polymerization catalysts include, for example, so-called Friedel-Crafts type compounds such as tin tetrachloride, tin tetrabromide, titanium tetrachloride, aluminum trichloride, zinc chloride, vanadium trichloride, antimony pentafluoride, boron trifluoride, boron trifluoride diethyl etherate, boron trifluoride acetic anhydrate, and boron trifluoride coordination compounds, e.g., a boron trifluoride triethylamine complex compound; inorganic acids and organic acids such as perchloric acid, acetyl perchlorate, hydroxyacetic acid, trichloroacetic acid, and p-toluenesulfonic acid; composite salt compounds such as triethyloxonium tetrafluoroborate, triphenylmethyl hexafluoroantimonate, allyldiazonium hexafluorophosphate, and allyldiazonium tetrafluoroborate; and alkyl metals such as diethylzinc, triethylaluminum and diethylaluminum chloride.

Anionic polymerization catalysts include, for example, alkali metals such as sodium and potassium; alkali metal complex compounds such as sodiumnaphthalene and potassium-anthracene; alkali metal hydrides such as sodium hydride; alkaline earth metal hydrides such as calcium hydride; alkali metal alkoxides such as sodium methoxide, potassium t-butoxide, and potassium octoxide; alkali metal salts of carboxylic acids such as sodium caproate and potassium stearate; alkaline earth metal salts of carboxylic acids such as magnesium caproate and calcium stearate; amines such as n-butylamine, dibutylamine, distearylamine, trioctylamine, and pyridine; quaternary ammonium salts such as ammonium stearate, tetrabutylammonium methoxide, tetrabutylammonium octanoate, dimethyldistearylammonium acetate, trimethylbenzylammonium acetate, and trimethylbenzylammonium methoxide; phosphonium salts such as tetramethylphosphonium propionate, trimethylbenzylphosphonium ethoxide and tetrabutylphosphonium stearate; tetravalent organotin compounds such as tributyltin chloride, diethyltin dilaurate, dibutyltin dimethoxide, dibutyltin dilaurate, dioctyltin dilaurate; and tributyltin laurate; alkyl metals such as n-butyllithium and ethylmagnesium bromide; and organic chelate compounds such as trisacetylacetonecobalt.

These cationic polymerization catalysts and anionic polymerization catalysts are used normally in an amount of 0.0005-5 parts by weight per 100 parts by weight of formaldehyde or trioxane.

The homopolymerization or copolymerization is carried out in the absence of a solvent or in an organic medium.

The organic medium usable in the present invention includes, for example, aliphatic hydrocarbons such as n-pentane, n-hexane, n-heptane, n-octane, cyclohexane, and cyclopentane; aromatic hydrocarbons such as benzene, toluene and xylene; halogenated aliphatic hydrocarbons such as methylene chloride, chloroform, carbon tetrachloride, ethylene chloride, and trichloroethylene; and halogenated aromatic hydrocarbons such as chlorobenzene and o-dichlorobenzene. These organic media may be used singly or in an admixture of two or more.

It is preferred to use these organic media in such combination that properly swell the particulate crosslinked polymer dispersed in the polymerization system.

Polymerization temperature is usually set in the range of $-20°-230°$ C., but is more preferably $20°-210°$ C. in the case of not using a solvent and, in the case of using an organic medium, is more preferably $-10°-120°$ C.

Polymerization time is not critical, but is set within the range of 5 seconds-300 minutes.

After lapse of a given time, a terminator is added to the reaction system or the polymer is separated from the medium, thereby to complete polymerization. Usually, the resulting polymer is stabilized by eliminating unstable terminals by hydrolysis or by capping the unstable terminals by esterification or the like. The stabilized acetal copolymer to which a stabilizer is added is put into practical use.

In the production of the acetal copolymer of the present invention, other polyacetals excellent in isotropy can also be obtained easily with respect to the production technique by using polymers other than the above-mentioned particulate crosslinked polymer and other than the polyacetal. The "other polyacetals" here means acetal copolymers obtained by using polymers other than a polyacetal in place of the above particulate crosslinked polymer.

That is, another object of the present invention is to provide a process for producing an acetal copolymer composed of polyacetal units and polymer units other than polyacetal which comprises a polyacetal and a polymer other than a polyacetal which are reaction bonded through a functional group mentioned below and which has a viscosity of 0.1-10 (dl/g), characterized by homopolymerizing formaldehyde or trioxane or copolymerizing formaldehyde or trioxane with a cyclic ether in the presence of a polymer other than a polyacetal which has a functional group selected from the group consisting of a hydroxyl group, a carboxyl group, an amino group, an amide group, an alkoxy group, an acid anhydride group, and an epoxy group and has an average dispersion particle size of 0.01-2000 μm.

Polymers other than a polyacetal and other than the particulate crosslinked polymer (hereinafter referred to as "other polymers") in the present invention can be classified into the following two groups.

The first group includes polymers (hereinafter referred to as "polymer ①") having at a terminal at least one functional group selected from the group consisting of a hydroxyl group, a carboxyl group, an amino group, an amide group, an alkoxy group, an acid anhydride group and an epoxy group. The second group includes polymers (hereinafter referred to as "polymer ②") having at least one of the above functional groups in the main chain.

When the polyacetal is referred to as A and the other polymer is referred to as B and when polymer ① has a functional group at one terminal thereof, A-B diblock copolymers can be obtained and when polymer ① has functional groups at both terminals, A-B-A triblock copolymers can be obtained. Furthermore, when the other polymer is polymer ②, acetal graft copolymers having B as a backbone polymer and A as a branch polymer can be obtained.

Compounds of polymer ① include, for example, rigid polymers such as polyamides (nylon-6, -66, -11, -12, etc.), polyethylene terephthalate, polybutylene terephthalate, polycarbonate, polyphenylene ether, polyarylate, and polyphenylene sulfide and soft polymers such as thermoplastic elastomers of the polyester type, polyurethane type, polyamide type and polystyrene type.

Compounds of polymer ② include, for example, compounds shown below and compounds obtained by modifying the compounds shown below using graft-copolymerizable vinyl monomers as referred to hereinbefore in the presence or absence of a peroxide by an extruder or the like (hereinafter referred to as modified polymer ②).

That modified polymer ② has been modified with a graft-copolymerizable vinyl monomer can be easily confirmed by general analysing techniques such as IR.

Polymers ② or compounds usable for production of modified polymers ② include, for example, rigid polymers such as AAS resin, AES resin, AS resin, ABS resin, ethylene-vinyl chloride copolymer, high-density polyethylene, low-density polyethylene, polypropylene, ultra-high molecular weight polyethylene, polyvinyl alcohol, and polyvinyl ether and soft polymers such as ethylene-propylene copolymer, ethylene-propylene-diene copolymer, styrene-diene copolymer, hydrogenated styrene-diene copolymer, isobutylene-maleic anhydride copolymer, ethylene-vinyl acetate copolymer, polybutadiene, polyisoprene, and acetonitrile-butadiene copolymer.

The functional group possessed by the other polymer is preferably a hydroxyl group in view of stability of the acetal copolymer as in the case of the particulate crosslinked polymer.

When the other polymer is modified polymer ②, the proportion of graft-copolymerizable monomer used for preparation of the modified polymer ② is preferably 0.05-30% by weight, and more preferably 0.1-20% by weight.

For easy production of the acetal copolymer with respect to the production technique which is a feature of the present invention, it is necessary to allow the other polymer to be present as fine particles of 0.01-2,000 μm in average dispersion particle size in the polymerization system of the present invention as in the case of the particulate crosslinked polymer. The other polymer can be made into fine particles by grinding it using a customary grinder or the other polymer in the form of particles present in the production process of the other polymer can be used as it is.

A more preferred breadth of distribution of average dispersion particle size of the other polymer is 0.1–1,000 μm.

A narrow distribution of dispersion particle size of the other polymer in the polymerization system is preferred and more preferred is 0.01–3,000 μm.

Furthermore, it is preferred that particles of the other polymer are swollen to such an extent in the polymerization system that the shape of the particles is not greatly damaged.

On the other hand, if the particles of the other polymer are swollen too much and the shape of the particles is lost or they are completely dissolved in the polymerization system, the resulting acetal copolymer is in the state of a viscous slurry. Thus, filtration and drying of the acetal copolymer are difficult and the object of the present invention to produce the acetal copolymer easily with respect to production technique cannot be attained.

The proportion of the other polymer in the acetal copolymer obtained in the present invention is preferably 1.0–90% by weight, and more preferably 5.0–70% by weight, based on the total weight of the acetal copolymer.

As the other polymers used in the present invention, there may be used appropriate polymers depending on the characteristics required for the resulting acetal copolymer.

For example, when impact resistance is to be imparted to acetal copolymer, the other polymer is preferably a soft polymer and more preferably, a polymer ② such as ethylene-propylene copolymer, ethylene-propylene-diene copolymer, styrene-diene copolymer, and hydrogenated styrene-diene copolymer. Dienes copolymerized with ethylene-propylene copolymer here are preferably dicyclopentadiene, ethylidenenorbornene, methylenenorbornene, and 1,4-hexadiene. Dienes copolymerized with styrene are preferably butadiene, isoprene and cyclopentadiene.

When sliding characteristic is the imparted to the acetal copolymer, the other polymers are preferably polymers ② such as high-density polyethylene, low-density polyethylene, ultra-high molecular weight polyethylene and ethylene-propylene copolymer.

When weathering resistance and coating and printing characteristics are to be imparted to the polyacetal copolymer, the other polymers are preferably polymers ② such as AAS resin, AES resin, AS resin, and ABS resin.

Features of the process for producing the acetal copolymer of the present invention can be summarized as follows.

(1) The acetal copolymer just after copolymerization is in the form of particles and there are no problems in production technique such as filtration and drying and the process can be industrially practised.

(2) The polymer other than the polyacetal is in the form of fine particles in the polymerization system and so it functions as a molecular weight modifier at a high rate and an acetal copolymer having excellent properties can be obtained.

(3) Because of easiness in the production technique (related to (1)), production of an acetal copolymer containing a polymer other than a polyacetal in a high proportion which has been hitherto impossible can be easily attained.

(4) Sticking of polymer to the inside of the polymerization tank is minimal and the acetal copolymer can be smoothly produced.

EXAMPLES

The present invention will be explained by the following examples and comparative examples, but the present invention is not to be limited by them.

Items of measurement and the methods for measurement thereof in the examples and comparative examples are as follows.

(1) Easiness In Production Technique

Polymer slurry obtained in the polymerization was filtered by a glass filter (G2, maximum pore diameter 100–150 μm) and easiness of polymerization was evaluated by easiness in filtration and time required for filtration. This evaluation is an indication of the possibility of easy production of acetal copolymer with respect to production technique.

The symbol "0" in the results of evaluation means as follows:

0: Polymer slurry can be instantaneously separated into particulate polymer and solvent (colorless and transparent).

(2) Average Particle Size

Average particle size of the particulate crosslinked polymer was measured by photography using an electron microscope.

(3) Average Dispersion Particle Size

Measurement was conducted using a customary particle size distribution measuring device (Coulter counter).

(4) Analysis of Composition of Acetal Copolymer

Proportions of the particulate crosslinked polymer and other polymer contained in the acetal copolymer were measured by the following method. That is, the resulting acetal copolymer was extracted for about 5 hours at the boiling point of an organic solvent (e.g., toluene) which can dissolve only the other polymer used as a molecular weight modifier or/and an organic solvent (e.g., hexafluoro isopropanol) which can dissolve only polyacetal. 5.0 g of acetal copolymer after being subjected to extraction was accurately weighed and added to 100 ml of 1N hydrochloric acid and the polyacetal portion in the acetal copolymer was completely decomposed at 130° C. for 2 hours. The residue after decomposition was washed and dried and the weight of the residue was measured and the proportions of the particulate crosslinked polymer and the other polymer in the acetal copolymer were obtained.

(5) Viscosity 25 mg of acetal copolymer was dissolved in 5 ml of a mixed solvent (p-chlorophenol 50% by weight and tetrachloroethane 50% by weight). Viscosity was measured using an Ostwald viscosity tube at 60° C. The viscosity is an indication of the molecular weight of the acetal copolymer.

(6) Measurement of Properties

① Tensile Weld Characteristics

This was measured in accordance with ASTM D-638. The weld test was conducted using a test piece which forms a weld line at the center on a shape of a test piece of double gate. Distance between chucks was 114 mm (standard) and pulling rate was 50 mm/min.

② Izod Impact Characteristics

This was measured in accordance with ASTM D-256.

EXAMPLE 1

(1) Preparation of Particulate Crosslinked Polymer (A)

In a 10 l beaker provided with a stirrer and a condenser were charged 5.7 l of distilled water, 20 g of sodium dioctylsulfosuccinate as an emulsifier, and 1.2 g of Rongalit as a reducing agent to carry out homogeneous dissolution.

Thereto was added a homogeneous solution of 1,270 g of n-butyl acrylate (hereinafter referred to as "BA"), 320 g of styrene (hereinafter referred to as "St"), 20 g of diethylene glycol diacrylate (hereinafter referred to as "DEGA"), 1.6 g of diisopropylbenzene hydroperoxide (hereinafter referred to as "PBP"), and 150 g of 2-hydroxyethyl methacrylate (hereinafter referred to as "HEMA") as a graft-copolymerizable vinyl monomer having a hydroxyl group and polymerization was carried out at 80° C. Reaction was completed in about 40 minutes. Tg of the resulting polymer was −37° C.

Then, the polymer was heated to 95° C. and was left for 1 hour. The resulting polymer was introduced into a 0.5% aqueous aluminum chloride solution to agglomerate and the agglomerate was washed with warm water five times and dried to obtain a white particulate crosslinked polymer (A).

Average particle size of this particulate crosslinked polymer was 0.21 μm.

(2) Preparation of Acetal Copolymer

In 10 l of cyclohexane was suspended 1,060 g of the particulate crosslinked polymer (A) obtained in (1) at an average dispersion particle size of 150 μm. Thereafter, to the cyclohexane were continuously fed anhydrous formaldehyde at 2000 g/hr and tetrabutylammonium acetate as a polymerization catalyst at 0.30 g/hr for 1 hour, during which the polymerization temperature was kept at 50° C.

The resulting polymer slurry contained particulate polymer and when this polymer slurry was filtered using a glass filter (G2), the slurry was able to be separated easily and rapidly into particles and solvent.

The particles were contacted with acetic anhydride in the form of vapor to carry out terminal stabilization, thereby to obtain an acetal copolymer of the present invention.

The proportion of the particulate crosslinked polymer (A) in the acetal copolymer was 33% by weight. Viscosity of the acetal copolymer was 2.8 (dl/g).

A known stabilizer such as an antioxidant was added to this acetal copolymer and the copolymer was melt kneaded in a 30 mmφ twin-screw extruder having a high shearing performance at a cylinder temperature of 200° C., a screw speed of 100 rpm, and a extrusion amount of about 5 kg/hr to obtain pellets of the acetal copolymer.

The pellets were sufficiently dried and injection molded at a cylinder temperature of 200° C. to obtain a test piece. Evaluation was carried out of the test piece.

Tensile weld characteristics are shown below.

Tensile weld characteristics (weld portion/nonweld portion)

| Strength (kg/cm²) | Elongation (%) |
|---|---|
| 288/292 | 59/67 |

This acetal copolymer had good weld characteristics and had the mechanical properties excellent in isotropy of the present invention. This copolymer also had an excellent impact resistance of 63 kg cm/cm in Izod impact value.

Comparative Example 1

A particulate crosslinked polymer (B) was prepared in the same manner as in Example 1 except that HEMA was not used. Furthermore, the procedure was conducted in the same manner as in Example 1 except that acetic anhydride as a molecular weight modifier was fed at 3 g/hr in the preparation of the acetal copolymer.

A part of the resulting acetal copolymer was taken out and extracted with hexafluoro isopropanol. Weight retention after extraction based on that before extraction was 36% by weight. This indicates that most of the polyacetal was extracted and removed and means that reaction bonding was not present between the polyacetal and the particulate crosslinked polymer (B).

Tensile weld characteristics of the resulting acetal copolymer are shown below.

| Strength (kg/cm²) | Elongation (%) |
|---|---|
| 189/290 | 7/64 |

Thus, when the polyacetal and the particulate crosslinked polymer were not reaction bonded because a particulate crosslinked polymer having no functional group was used, an acetal copolymer having mechanical properties excellent in isotropy was not obtained.

Izod impact value of this copolymer was low, namely, 17 kg cm/cm.

EXAMPLES 2-5

The procedure of Example 1 was repeated except that the proportion of the particulate crosslinked polymer in the acetal copolymer was changed and the same evaluation was conducted. The results are shown in Table 1. Good results were obtained for all proportions of the particulate crosslinked polymer.

EXAMPLES 6-8

The procedure of Example 1 was repeated except that the proportions of BA and St which constituted the particulate crosslinked polymer were changed to change the Tg of the particulate crosslinked polymer, and the same evaluation was conducted. Good results were obtained as shown in Table 1.

EXAMPLES 9-11

The procedure of Example 1 was repeated except that the addition amount of emulsifier was changed and the average particle size of the particulate crosslinked polymer was changed and the same evaluation was conducted. The results are shown in Table 1. Acetal copolymers having mechanical properties excellent in isotropy in a wide average particle size range were obtained.

EXAMPLES 12-14

The procedure of Example 1 was repeated except that the amount of HEMA was changed to change the number of hydroxyl groups possessed by the particulate crosslinked polymer and the same evaluation was conducted. The results are shown in Table 1. Good results were obtained in all of these Examples.

EXAMPLE 15

(1) Preparation of Particulate Crosslinked Polymer (C)

A particulate crosslinked polymer (C) of two-phase structure having a hard phase outside a soft phase was prepared in the following manner.

A polymer constituting the soft phase was prepared in the same manner as in Example 1 except that 1,270 g of BA, 320 g of St, 20 g of DEGA, and 13 g of allyl methacrylate (hereinafter referred to as "ALMA") were used as monomers for polymerization in place of those used for preparation of the particulate crosslinked polymer (A). Tg of the polymer was $-38°$ C.

Next, for formation of the hard phase as the outermost phase, thereto was added a homogeneous solution of 680 g of methyl methacrylate (hereinafter referred to as "MMA"), 4.0 g of BA, and 14 g of HEMA as monomers and 0.6 g of PBP and 0.2 g of n-octylmercaptan (hereinafter referred to as "OM") and polymerization was carried out. Tg of the polymer obtained by single polymerization of these monomers was 109° C. The reaction at this stage terminated in about 15 minutes.

Furthermore, the same procedure as in Example 1 was carried out to obtain the white particulate crosslinked polymer (C).

(2) Preparation of Acetal Copolymer

An acetal copolymer was obtained in the same manner as in Example 1 and evaluation thereof was conducted in the same manner.

As shown in Table 2, this acetal copolymer had mechanical properties excellent in isotropy. In this way, an acetal copolymer having mechanical properties excellent in isotropy can also be obtained using a particulate crosslinked polymer having a two-phase structure.

EXAMPLES 16-26

The procedure of Example 1 was repeated except that the composition (graft-copolymerizable vinyl monomer) and proportion of the particulate crosslinked polymer were changed and the same evaluation was conducted.

Results of the evaluation are shown in Table 2. In all of these Examples, the resulting acetal copolymers had the mechanical properties excellent in isotropy of the present invention.

EXAMPLE 27

The procedure of Example 15 was repeated except that 170 g of glycidyl methacrylate was used in place of HEMA, thereby to obtain a particulate crosslinked polymer (D).

Then, 5000 g of the particulate crosslinked polymer (D), 15 kg of trioxane, 750 g of ethylene oxide, 0.50 g of boron trifluoride, and 50 g of methylal were charged in a kneader having two sigma-type blades and polymerization was carried out at 80° C. for 45 minutes. Subsequently, 1200 g of triethylamine and 5 kg of water were added, followed by stirring at 150° C. for 30 minutes to stabilize the polymer. A stabilizer such as an antioxidant was added to this polymer and the polymer was pelletized by a 30 mm$\phi$ single-screw extruder and evaluation was conducted as in Example 15.

The results are shown in Table 2. It can be seen that the resulting acetal copolymer obtained in the cationic polymerization system also had very good results as in this Example.

Comparative Examples 2 and 3

Two kinds of particulate crosslinked polymers having average particle sizes of 0.009 $\mu$m and 11 $\mu$m were prepared in the same manner as in Example 1 except that the amount of emulsifier was changed to change the average particle size of the particulate crosslinked polymer in the preparation of the particulate crosslinked polymer (A).

Using these polymers, acetal copolymers were prepared in the same manner as in Example 1. Results of the evaluation of the resulting acetal copolymers are shown in Table 3.

As can be seen from Table 3, an acetal copolymer having high impact resistance characteristics was not obtained when the average particle size was less than 0.01 $\mu$m and weld characteristics of the acetal copolymer decreased considerably when the average particle size was more than 10 $\mu$m.

Comparative Examples 4 and 5

The procedure of Example 1 was repeated except that the amount of HEMA was changed in the preparation of the particulate crosslinked polymer (A) and the proportion of the particulate crosslinked polymer in the acetal copolymer was changed and evaluation was conducted as in Example 1. The results are shown in Table 3.

As shown in Table 3, tensile properties and the Izod impact value of the resulting acetal copolymer decreased greatly when the viscosity was less than 0.1. Furthermore, when the viscosity was more than 10, the resulting acetal copolymer was not able to be injection molded and thus was not practical.

EXAMPLE 28

2-Hydroxyethyl methacrylate modified ethylene-propylene elastomer (hereinafter referred to as "modified EPR") was used as the other polymer. This modified EPR had eight hydroxyl groups in the main chain and had a number-average molecular weight of $6 \times 10^4$ and a polypropylene content of 30% by weight. This modified EPR was freeze-ground by a customary grinder at $-160°$ C. to an average dispersion particle size of 150 $\mu$m.

In 10 l of dehydrated cyclohexane was suspended 1,050 g of this modified EPR which had been sufficiently dried under reduced pressure and dehydrated in the form of particles having the average dispersion particle size mentioned above. In a 12 liter polymerization tank filled with cyclohexane were continuously fed the modified EPR at 250 g/hr, formaldehyde of 99.9% purity at 1,000 g/hr, cyclohexane at 5 l/hr, and tetrabutylammonium acetate as a polymerization catalyst at 0.15 g/hr for 4 hours, during which the polymerization temperature was kept at 60° C.

The resulting polymer slurry contained the polymer in particle form and when this polymer slurry was filtered by a glass filter (G2), it was able to be easily and rapidly separated into particles and polymerization solvent. Substantially no polymer stuck to the polymerization tank.

Furthermore, the particles were stabilized by contacting them with acetic anhydride vapor to obtain the acetal copolymer of the present invention.

The amount of the modified EFR introduced in this acetal copolymer was 18.9% by weight and the viscosity of the acetal copolymer was 4.1 (dl/g).

Then, a known stabilizer such as an antioxidant was added to the resulting acetal graft copolymer and, thereafter, the copolymer was melt kneaded by a 45 mm$\phi$ twin-screw extruder at a cylinder temperature of 210° C., a screw speed of 50 rpm, and an extrusion amount of 2 kg/hr to obtain pelletized acetal copolymer. The pellets were sufficiently dried and then injection molded at a cylinder temperature of 210° C. to obtain a molded piece. This was subjected to measurement of tensile weld characteristics and Izod impact value.

Tensile weld characteristics (weld portion/non-weld portion)

| Strength (kg/cm$^2$) | Elongation (%) |
|---|---|
| 470/475 | 76/81 |

Izod impact value was 48 kg cm/cm which indicates a high impact resistance. The resulting acetal copolymer had mechanical properties excellent in isotropy.

EXAMPLES 29-32

The procedure of Example 28 was repeated except that the proportions of the modified EPR and HEMA were changed and evaluation was conducted as in Example 28. The results are shown in Table 4.

In all of these Examples, acetal copolymers were able to be produced easily with respect to production technique as required by the present invention. Further, the resulting acetal copolymers had mechanical properties excellent in isotropy.

Comparative Example 6

The procedure of Example 28 was repeated except that 1,000 g of the modified EPR used was completely dissolved in 10 l of dehydrated toluene and this was continuously fed into the cyclohexane at 250 g/hr.

The resulting polymer slurry was very highly viscous and an acetal copolymer in the form of particles was not seen in the polymerization solvent.

Filtration by glass filter (G2) required a very long time for separating the acetal copolymer and polymerization solvent from the polymer slurry and the filtrate was somewhat cloudy. It was considered that this is because acetal copolymer which had not yet become particles entered into the filtrate. Thus, it must be said that it was impossible to produce acetal copolymer easily with respect to the actual production technique.

Furthermore, much polymer stuck to the inside of the polymerization tank.

Comparative Example 7

The procedure of Example 1 was repeated except that 2,000 g of the modified EPR used was completely dissolved in 20 l of dehydrated toluene and the solution was continuously fed into the cyclohexane at 500 g/h (of modified EPR).

When the resulting polymer slurry was filtered by glass filter (G2), no filtrate was obtained and thus filtration was impossible.

In this way, when the other polymer used is completely dissolved in a solvent and is used, if the proportion of the other polymer in the acetal copolymer is high as in this comparative example, it is no longer possible to produce acetal copolymer stably with respect to the actual production technique.

EXAMPLES 33-38

Example 28 was repeated except that various other polymers were used in place of the modified EPR and evaluation was conducted. The results are shown in Table 4.

In all of these examples, it was possible to produce acetal copolymers easily with respect to the production technique as required by the present invention. Furthermore, the resulting acetal copolymers had mechanical characteristics excellent in isotropy.

EXAMPLE 39

As the other polymer, 5,000 g of glycidyl methacrylate modified EPR ground to an average dispersion particle size of 45 $\mu$m was charged into a kneader having two sigma type blades and thereto were further added 10 kg of trioxane, 500 g of ethylene oxide, 0.30 g of boron trifluoride, and 30 g of methylal and polymerization was carried out at 70° C. for 60 minutes. Then, 1,200 g of triethylamine and 5 kg of water were added and stirring was conducted for 30 minutes at 70° C. to stabilize the polymer. To this polymer was added a stabilizer such as an antioxidant and the polymer was pelletized by a 50 mm$\phi$ single-screw extruder and, thereafter, evaluation was conducted as in Example 28.

The results are shown in Table 4. As shown in this example, the acetal copolymer obtained in the cationic polymerization system also had mechanical properties excellent in isotropy.

EXAMPLES 40-47

In the same manner as in Example 28, evaluation was conducted using the other polymers having functional group at a terminal (polymer ①). The results are shown in Table 5.

In all of these examples, it was possible to produce acetal copolymers easily with respect to the production technique. Further, the resulting acetal copolymer had mechanical properties excellent in isotropy as required by the present invention.

TABLE 1

| | Composition of particulate crosslinked polymer | | | | |
|---|---|---|---|---|---|
| Example | Vinyl monomer | Graft-copolymerizable vinyl monomer (proportion*) | Average particle size ($\mu$m) | Average dispersion particle size ($\mu$m) | Easiness in production technique |
| 2 | BA, St | HEMA (8.5) | 0.21 | 150 | c |
| 3 | '' | '' | '' | '' | c |
| 4 | '' | '' | '' | '' | c |
| 5 | '' | '' | '' | '' | c |

TABLE 1-continued

| | | | | | |
|---|---|---|---|---|---|
| 6 | " | " | " | " | |
| 7 | " | " | " | " | |
| 8 | " | " | " | " | |
| 9 | " | " | 0.07 | 120 | |
| 10 | " | " | 0.70 | 135 | |
| 11 | " | " | 1.40 | 180 | |
| 12 | " | HEMA (0.9) | 0.21 | 150 | |
| 13 | " | HEMA (5.8) | " | " | |
| 14 | " | HEMA (21.3) | " | " | |

| | Characteristics of acetal copolymer | | | | |
|---|---|---|---|---|---|
| | Viscosity | Proportion** | Tensile weld characteristics (weld portion/non-weld portion) | | |
| Example | (dl/g) | (wt %) | strength (kg/cm$^2$) | Elongation (%) | Notes |
| 2 | 4.9 | 5 | 670/675 | 36/38 | Izod impact value 13 kg cm/cm |
| 3 | 3.1 | 20 | 492/501 | 54/58 | Izod impact value 38 kg cm/cm |
| 4 | 1.9 | 60 | 198/200 | 70/80 | Izod impact value 72 kg cm/cm |
| 5 | 1.8 | 80 | 181/190 | 85/84 | Izod impact value 75 kg cm/cm |
| 6 | 2.6 | 33 | 297/310 | 56/57 | Tg of particulate crosslinked polymer −21° C. |
| 7 | 2.9 | 33 | 331/343 | 50/54 | Tg of particulate crosslinked polymer 0° C. |
| 8 | 2.4 | 32 | 317/348 | 47/47 | Tg of particulate crosslinked polymer 12° C. |
| 9 | 2.1 | 33 | 291/290 | 58/62 | |
| 10 | 2.4 | 33 | 265/281 | 60/64 | |
| 11 | 2.4 | 33 | 258/281 | 59/71 | |
| 12 | 6.1 | 36 | 290/290 | 59/61 | |
| 13 | 3.4 | 34 | 284/291 | 63/64 | |
| 14 | 1.0 | 33 | 292/299 | 54/59 | |

*Proportion of graft-copolymerizable vinyl monomer is % by weight based on total weight of particulate crosslinked polymer.
**Proportion is % by weight of particulate crosslinked polymer based on total weight of acetal copolymer.

TABLE 2

| | Composition of particulate crosslinked polymer | | | | |
|---|---|---|---|---|---|
| Example | Vinyl monomer | Graft-copolymerizable vinyl monomer (proportion*) | Average particle size (μm) | Average dispersion particle size (μm) | Easiness in production technique |
| 15 | BA. St/MMA, BA | HEMA (0.6) | 4.5 | 400 | 0 |
| 16 | BA. St | Acrylic acid (1.9) | 0.9 | 600 | 0 |
| 17 | BA. St | m-Aminostyrene (14.0) | 0.06 | 40 | 0 |
| 18 | 2-Ethylhexyl acrylate | Acrylamide (21.4) | 2.0 | 30 | 0 |
| 19 | Butadiene. St | Methoxyvinyl (5.4) | 4.9 | 470 | 0 |
| 20 | Butadiene. St | Maleic anhydride (4.2) | 7.2 | 800 | 0 |
| 21 | Butadiene. MMA | 2-Hydroxyethyl acrylate (5.4) | 2.0 | 1700 | 0 |
| 22 | St, MMA | Allyl alcohol (15.4) | 0.5 | 0.09 | 0 |
| 23 | Butadiene. St. acrylonitrile | Maleic acid (4.0) | 0.7 | 60 | 0 |
| 24 | Ethyl acrylate. St | Methoxyethyl methacrylate (24) | 0.1 | 72 | 0 |
| 25 | MMA | Methacrylamide (0.9) | 0.6 | 1.4 | 0 |
| 26 | BA. MMA | HEMA (18.1) | 0.4 | 40 | 0 |
| 27 | BA, st/MMA, BA | glycidyl methacrylate (6.9) | 0.7 | 86 | 0 |

| | | Characteristics of acetal copolymer | | |
|---|---|---|---|---|
| | Viscosity | Proportion** | Tensile weld characteristics (weld portion/non-weld portion) | |
| Example | (dl/g) | (wt %) | strength (kg/cm$^2$) | Elongation (%) |
| 15 | 7.9 | 33 | 310/320 | 50/57 |
| 16 | 2.1 | 16 | 518/520 | 45/49 |
| 17 | 1.4 | 20 | 490/500 | 50/56 |
| 18 | 0.4 | 81 | 167/171 | 89/89 |
| 19 | 1.7 | 16 | 589/600 | 36/41 |
| 20 | 1.9 | 18 | 559/571 | 43/48 |
| 21 | 1.6 | 20 | 689/700 | 28/29 |
| 22 | 0.2 | 61 | 801/803 | 25/26 |
| 23 | 1.4 | 43 | 429/481 | 46/49 |
| 24 | 0.4 | 72 | 196/200 | 72/80 |
| 25 | 4.8 | 18 | 830/841 | 15/17 |
| 26 | 7.0 | 5 | 691/701 | 20/21 |
| 27 | 2.1 | 27 | 280/290 | 60/61 |

*Proportion of graft-copolymerizable vinyl monomer is % by weight based on total weight of particulate crosslinked polymer.
**Proportion is % by weight of particulate crosslinked polymer based on total weight of acetal copolymer.

TABLE 3

| | Composition of particulate crosslinked polymer | | | | |
|---|---|---|---|---|---|
| Compar- ative | Vinyl | Graft-copolymerizable vinyl monomer | Average particle | Average dispersion particle | Easiness in production |

TABLE 3-continued

| Example | monomer | (proportion*) | size (μm) | size (μm) | technique |
|---|---|---|---|---|---|
| 2 | BA, St | HEMA (8.5) | 0.009 | 0.9 | 0 |
| 3 | BA, St | HEMA (8.5) | 11 | 1100 | 0 |
| 4 | BA, St | HEMA (4.1) | 0.6 | 70 | 0 |
| 5 | BA, St | HEMA (0.04) | 0.3 | 60 | 0 |

| Comparative Example | Characteristics of acetal copolymer | | | | |
|---|---|---|---|---|---|
| | Viscosity (dl/g) | Proportion** (wt %) | Tensile weld characteristics (weld portion/non-weld portion) | | Notes |
| | | | strength (kg/cm²) | Elongation (%) | |
| 2 | 2.1 | 33 | 300/340 | 30/40 | Izod impact value 8 kg cm/cm |
| 3 | 2.0 | 33 | 151/301 | 11/60 | |
| 4 | 0.009 | 32 | 79/108 | 4/8 | Izod impact value 0.9 kg cm/cm |
| 5 | 11 | 34 | — | — | Molding was impossible. |

*Proportion of graft-copolymerizable vinyl monomer is % by weight based on total weight of particulate crosslinked polymer.
**Proportion is % by weight of particulate crosslinked polymer based on total weight of acetal copolymer.

TABLE 4

| Example | Composition of other polymer | | Average dispersion particle size (μm) | Easiness in production technique |
|---|---|---|---|---|
| | | Graft-copolymerizable vinyl monomer (proportion*) | | |
| 29 | Modified EPR | HEMA (1.8) | 80 | 0 |
| 30 | " | HEMA (5.2) | 51 | 0 |
| 31 | " | HEMA (0.9) | 240 | 0 |
| 32 | " | HEMA (6.9) | 170 | 0 |
| 33 | Ethylene-propylene-dicyclo-pentadiene copolymer | 2-Hydroxyethyl acrylate (2.1) | 50 | 0 |
| 34 | High-density polyethylene | m-Aminostyrene (7.1) | 600 | 0 |
| 35 | Low-density polyethylene | Acrylic acid (2.5) | 1700 | 0 |
| 36 | Styrene-butadiene copolymer | Maleic anhydride (1.0) | 700 | 0 |
| 37 | Hydrogenated styrene-butadiene copolymer | Allyl alcohol (0.2) | 80 | 0 |
| 38 | Low-density polyethylene | Allyl alcohol (0.8) | 90 | 0 |
| 39 | Modified EPR | Glycidyl methacrylate (6.0) | 45 | 0 |

| Example | Characteristics of acetal copolymer | | | | |
|---|---|---|---|---|---|
| | Viscosity (dl/g) | Proportion** (wt %) | Tensile weld characteristics (weld portion/non-weld portion) | | |
| | | | strength (kg/cm²) | Elongation (%) | |
| 29 | 4.4 | 9.8 | 651/670 | 43/50 | Izod impact value 23 kg cm/cm |
| 30 | 2.0 | 70.1 | 251/260 | 114/120 | |
| 31 | 6.1 | 85.0 | 210/220 | 129/141 | |
| 32 | 4.9 | 60.1 | 268/279 | 98/99 | |
| 33 | 1.9 | 14.4 | 508/510 | 35/39 | |
| 34 | 1.0 | 10.9 | 619/630 | 38/39 | |
| 35 | 2.9 | 5.0 | 680/691 | 28/30 | |
| 36 | 4.6 | 26.7 | 389/400 | 57/61 | Izod impact value 48 kg cm/cm |
| 37 | 7.2 | 61.0 | 236/240 | 118/120 | |
| 38 | 3.0 | 12.0 | 610/612 | 43/43 | |
| 39 | 2.6 | 36.1 | 281/297 | 69/70 | |

*Proportion of graft-copolymerizable vinyl monomer is % by weight based on total weight of particulate crosslinked polymer
**Proportion is % by weight of particulate crosslinked polymer based on total weight of acetal copolymer

TABLE 5

| Example | Composition of other polymer | | Average dispersion particle size (μm) | Easiness in production technique |
|---|---|---|---|---|
| | | Functional group | | |
| 40 | Polybutylene terephthalate, poly-tetra-methylene glycol copolymer | Hydroxyl group Carboxyl group | 180 | 0 |
| 41 | Nylon-6, polypropylene glycol copolymer | Amino group Carboxyl group | 150 | 0 |
| 42 | Polyurethane synthesized from 4,4'-diphenyl methane, diisocyanate, tetramethylene glycol, polytetramethylene glycol | Hydroxyl groups (two) | 400 | 0 |
| 43 | Polystyrene, polybutadiene copolymer | Hydroxyl group | 80 | 0 |
| 44 | Polyethylene terephthalate | Carboxyl groups (two) | 40 | 0 |
| 45 | Polybutylene terephthalate | Carboxyl groups (two) | 210 | 0 |
| 46 | Polycarbonate | Hydroxyl group | 8 | 0 |
| 47 | Polyphenylene ether | Hydroxyl group | 10 | 0 |

| | Characteristics of acetal copolymer | | | |
|---|---|---|---|---|
| | Viscosity | Proportion** | Tensile weld characteristics (weld portion/non-weld portion) | |

TABLE 5-continued

| Example | (dl/g) | (wt %) | strength (kg/cm²) | Elongation (%) | Notes |
|---|---|---|---|---|---|
| 40 | 2.9 | 25 | 391/400 | 40/51 | Izod impact value 40 kg cm/cm |
| 41 | 1.8 | 5.7 | 560/570 | 41/46 | Izod impact value 18 kg cm/cm |
| 42 | 1.6 | 30 | 401/420 | 68/71 | Izod impact value 39 kg cm/cm |
| 43 | 4.6 | 30 | 400/401 | 65/68 | |
| 44 | 3.6 | 10 | 580/582 | 47/51 | |
| 45 | 1.9 | 5 | 620/631 | 35/38 | |
| 46 | 3.1 | 33 | 704/720 | 29/31 | |
| 47 | 2.0 | 21 | 549/610 | 34/36 | |

**Proportion is % by weight of particulate crosslinked polymer based on total weight of acetal copolymer.

INDUSTRIAL APPLICABILITY

According to the present invention, it has become possible to produce acetal copolymers having mechanical properties excellent in isotropy industrially and easily with respect to production technique by reaction bonding a polyacetal and polymers other than polyacetals which have specific properties.

We claim:

1. A process for producing a graft acetal copolymer comprising polyacetal units grafted to particulate crosslinked vinyl polymer units, said crosslinked vinyl polymer units comprising 0.05–30% by weight of vinyl monomer based on the total weight of particulate crosslinked vinyl polymer, said particulate crosslinked vinyl polymer is contained in the acetal copolymer in a proportion of from 1.0–90% by weight based on the total weight of the acetal copolymer, wherein said polyacetal and said vinyl polymer are bonded to each other through a functional group of said vinyl polymer, and said graft acetal copolymer has a viscosity of 0.1–10 dl/g, said process comprising homopolymerizing formaldehyde or trioxane or copolymerizing formaldehyde or trioxane with a cyclic ether in the presence of a suspension of said polymer other than a polyacetal, wherein said functional group is selected from the group consisting of a hydroxyl group, a carboxyl group, an amino group, an amide group, an alkoxy group, an acid anhydride group, and an epoxy group, and said polymer other than a polyacetal has an average dispersion particle size of 0.01–2000 μm.

2. A process according to claim 1, wherein the polymer other than a polyacetal comprises a polymer having a glass transition temperature of lower than 25° C.

3. A process according to claim 1, wherein the polymer other than a polyacetal is a particulate crosslinked polymer.

4. A process according to claim 3, wherein the particulate crosslinked polymer comprises an acrylate ester, a methacrylate ester, a conjugated diene compound, an aromatic compound, or a nitrile compound.

5. A process according to claim 3, wherein the particulate crosslinked polymer has a multi-phase structure of two or more phases which comprise repeating soft and hard phases, the polymer constituting the soft phase having a glass transition temperature of lower than 25° C., and the polymer constituting the hard phase having a glass transition temperature of 25° C. or higher.

6. A process according to claim 5, wherein the particulate crosslinked polymer has a two phase structure having the hard phase outside the soft phase.

7. A process according to claim 5, wherein the soft phase comprises an acrylate ester or a conjugated diene compound and the hard phase comprises a methacrylate ester, an aromatic compound or a nitrile compound.

8. A process according to claim 5, wherein the soft phase comprises n-butyl acrylate, 2-ethylhexyl acrylate, ethyl acrylate, isopropyl acrylate, butadiene, or styrene-butadiene and the hard phase comprises methyl methacrylate, ethyl methacrylate, propyl methacrylate, isobutyl methacrylate, styrene, or acrylonitrile.

9. A process according to claim 3, wherein the particulate crosslinked polymer comprises a graft-copolymerizable vinyl monomer having a functional group selected from the group consisting of a hydroxyl group, a carboxyl group, an amino group, an amide group, an alkoxy group, an acid anhydride group, and an epoxy group.

10. A process according to claim 9, wherein the amount of the graft-copolymerizable vinyl monomer is 0.05–30% by weight based on total weight of the particulate crosslinked polymer.

11. A process according to claim 2, wherein the polymer other than a polyacetal is an ethylene-propylene type, ethylene-propylene-diene type, styrene-diene type, or hydrogenated styrene-diene elastomer having a functional group in the main chain.

12. A process according to claim 1, wherein the polymer other than a polyacetal has a dispersion particle size distribution of 0.01–3000 μm.

13. A process according to claim 1, wherein the polymer other than a polyacetal has a hydroxyl group.

14. A process according to claim 1, wherein the amount of the polymer other than a polyacetal is 1.0–90% by weight based on the total weight of the acetal copolymer.

15. A process according to claim 1, wherein the homopolymerization of formaldehyde or trioxane or the copolymerization of formaldehyde or trioxane with a cyclic ether is carried out in an organic medium.

16. A graft acetal copolymer produced by the process of claim 11 comprising polyacetal units grafted to particulate crosslinked vinyl polymer units, wherein said graft acetal copolymer has a viscosity of 0.1–10 dl/g, said crosslinked vinyl polymer units comprising 0.05–30% by weight of vinyl monomer based on the total weight of particulate crosslinked vinyl polymer, said particulate crosslinked vinyl polymer is contained in the acetal copolymer in a proportion of from 1.0–90% by weight based on the total weight of acetal copolymer and has a functional group selected from the group consisting of a hydroxyl group, a carboxyl group, an amino group, an amide group, an alkoxy group, an acid anhydride group, and an epoxy group, and said particulate crosslinked vinyl polymer units have an average particle size of 0.01–10 μm, said polyacetal units and said particulate crosslinked vinyl polymer units being bonded to each other through said functional group.

17. An acetal copolymer according to claim 1, wherein the particulate crosslinked polymer comprises an acrylate ester, a methacrylate ester, a conjugated diene compound, an aromatic compound, or a nitrile compound.

18. An acetal copolymer according to claim 1, wherein the particulate crosslinked polymer comprises a polymer having a glass transition temperature of lower than 25° C.

19. An acetal copolymer according to claim 1, wherein the particulate crosslinked polymer has a multi-phase structure of two or more phases which comprise repeating soft and hard phases, the polymer constituting the soft phase having a glass transition temperature of lower than 25° C., and the polymer constituting the hard phase having a glass transition temperature of 25° C. or higher.

20. An acetal copolymer according to claim 14, wherein the particulate crosslinked polymer has a two phase structure having the hard phase outside the soft phase.

21. An acetal copolymer according to claim 14, wherein the soft phase comprises an acrylate ester or a conjugated diene compound and the hard phase comprises a methacrylate ester, an aromatic compound or a nitrile compound.

22. An acetal copolymer according to claim 14, wherein the soft phase comprises n-butyl acrylate, 2-ethylhexyl acrylate, ethyl acrylate, isopropyl acrylate, butadiene, or styrene-butadiene and the hard phase comprises methyl methacrylate, ethyl methacrylate, propyl methacrylate, isobutyl methacrylate, styrene, or acrylonitrile.

23. An acetal copolymer according to claim 1, wherein the particulate crosslinked polymer has a particle size distribution of 0.01-20 μm.

24. An acetal copolymer according to claim 1, wherein the particulate crosslinked polymer has a hydroxyl group.

25. An acetal copolymer according to claim 1, which contains the particulate crosslinked copolymer in an amount of 1.0-90% by weight based on total weight of the acetal copolymer.

* * * * *